(12) United States Patent
Potvin

(10) Patent No.: US 6,393,467 B1
(45) Date of Patent: May 21, 2002

(54) NETWORK INTERCONNECTED COMPUTING DEVICE, SERVER AND NOTIFICATION METHOD

(75) Inventor: Carl Potvin, Verdun (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/144,111

(22) Filed: Aug. 31, 1998

(51) Int. Cl.$^7$ .............................................. G06F 15/16
(52) U.S. Cl. ....................... 709/217; 709/218; 709/219; 709/220; 709/203
(58) Field of Search ................. 709/219, 220, 709/217, 218, 203; 713/162

(56) References Cited

U.S. PATENT DOCUMENTS

| | | | |
|---|---|---|---|
| 4,771,425 A | 9/1988 | Baran et al. | 370/85 |
| 4,969,184 A | 11/1990 | Gordon et al. | 379/100 |
| 4,995,074 A | 2/1991 | Goldman et al. | 379/97 |
| 5,363,431 A | 11/1994 | Schull et al. | 379/67 |
| 5,434,906 A | 7/1995 | Robinson | 379/67 |
| 5,533,110 A | 7/1996 | Pinard et al. | 379/201 |
| 5,577,105 A | 11/1996 | Baum et al. | 379/93 |
| 5,604,737 A | 2/1997 | Iwami et al. | 370/352 |
| 5,608,786 A | 3/1997 | Gordon | 379/100 |
| 5,610,910 A | 3/1997 | Foscaneanu et al. | 370/351 |
| 5,625,676 A | 4/1997 | Greco et al. | 379/88 |
| 5,805,587 A | 9/1998 | Norris et al. | 370/352 |
| 5,812,776 A * | 9/1998 | Gifford | 709/217 |
| 5,862,220 A * | 1/1999 | Perlman et al. | 713/162 |
| 5,974,453 A * | 10/1999 | Andersen et al. | 709/220 |
| 6,012,088 A * | 1/2000 | Li et al. | 709/219 |

FOREIGN PATENT DOCUMENTS

| | | |
|---|---|---|
| AU | B-56456/94 | 7/1996 |
| CA | 2110711 | 1/1993 |
| CA | 2197204 | 2/1996 |
| CA | 2167215 | 7/1997 |
| EP | 0 732835 A2 | 9/1996 |
| WO | WO 94/24803 | 10/1994 |
| WO | WO 95/18501 | 7/1995 |

(List continued on next page.)

OTHER PUBLICATIONS

Baran, P., "On Distributed Communications Networks", IEEE Transactions on Communications, (Mar. 1964), pp. 1–9.

Shankar, U. and C. Lai, "Interworking Between Access Protocol and Network Protocol for Interswitch ISDN Services", TENCON '89, Bombay, India, Nov. 1989.

(List continued on next page.)

*Primary Examiner*—Dung C. Dinh
*Assistant Examiner*—Chuong Ho

(57) ABSTRACT

A computer network (10) interconnected computing device (26) and server (16) are disclosed. The server (16) maintains a database (68) of known computing devices. The computing device (26) is intermittently connected to the network (10) and obtains an assigned network address each time a network connection is established. Thereafter, the computing device (26) contacts the server (46) and provides an identifier and the assigned network address to the server (16). The server (16) compares the identifier to entries of the database (68) to find a matching entry in the database (68). In response to finding a matching entry, the server (16) stores the assigned network address and provides a second network address stored at the server (16) or at computing device (26) to the computing device (26). The second network address is used by the computing device (26) as a homepage address to contact another network interconnected computer. Thereafter, the server (16) may provide data in real time to the computing device (26) using the stored network address.

21 Claims, 9 Drawing Sheets

FOREIGN PATENT DOCUMENTS

| WO | WO 96/05684 | 2/1996 |
|---|---|---|
| WO | WO 96/09714 | 3/1996 |
| WO | WO 96/38018 | 11/1996 |
| WO | WO 97/20424 | 6/1997 |
| WO | WO 97/26749 | 7/1997 |
| WO | WO 97/35416 | 9/1997 |
| WO | WO 97/37483 | 10/1997 |
| WO | WO 97/47118 | 12/1997 |
| WO | WO 98/01985 | 1/1998 |
| WO | WO 98/07266 | 2/1998 |

OTHER PUBLICATIONS

Casner, et al., "RFC14ZZ: Integrated Service in the Internet Architecture", Sep., 1993.

Clark, D.D., S. Shenker and L. Zhang, "Supporting Real–Time Applications in an Integrated Services Packet Network: Architecture and Mechanism", SIGCOMM92, Aug. 1992.

Yang, C., "RFC1789: INETPhone: Telephone Services and Servers on Internet", Network Working Group, Apr. 1995.

Braden et al., "RFC 1633: Integrated Services in the Internet Architecture: an Overview", Network Working Group, Jun. 1994.

Burson, A.F. and A.D. Baker, "Optimizing Communications Solutions", IEEE Communications Magazine, 31(1), (Jan. 1993), pp. 15–19.

"Workstation Communications System", IBM Technical Disclosure Bulletin, 37(9), (Sep. 1994), pp. 101–104.

Hansson, A., R. Nedjeral and I. Tonnby, "Phone Doubler—A Step Towards Integrated Internet and Telephone Communities", Ericsson Review 4 (1997), pp. 142–151.

"Here It Comes—the Phone Doubler", Ericsson Connexion, (Jun. 1997), p. 47.

"Internet and Ericsson", Ericsson Connexion, (Dec. 1996), pp. 46–47.

Low, C., "The Internet Telephony Red Herring", Hewlett Packard, Laboratories Tech. Report, May 15, 1996, pp. 1–15.

CMP Publications, Inc., Masud, Sam, "Product Supports Voice on Net", Apr. 7, 1997, p. 1–2.

Business Wire, Inc., "Ericsson Product Allows Simultaneous Voice and Internet Connections Over One Phone Line", Mar. 11, 1997, pp. 1–2.

Business Wire, Inc., "Ericsson's New Phone Doubler Combines Voice and Internet Over a Single Telephone Line", Mar. 10, 1997, pp. 1–2.

\* cited by examiner

| USER | PASSWORD | STATUS | IP ADDRESS | SUBSCRIBER DN |
|---|---|---|---|---|
| John Smith | | 0 | - | (212) 555-1234 |
| Jane Doe | | 1 | 207.23.24.27 | (416) 555-6789 |
| | | | | |
| | | | | |
| | | | | |

FIG. 4

NETWORK INTERCONNECTED COMPUTING DEVICE, SERVER AND NOTIFICATION METHOD

FIELD OF THE INVENTION

The present invention relates to a networked computing devices, and more particularly to network connected computing device and server and a method of notifying the server of a network connection by the computing device.

BACKGROUND OF THE INVENTION

Packet switched computer data networks have become widely used. The public internet is a well known example of such a network. Packet switched data networks allow network interconnected computing devices to communicate by exchanging data bundled in packets or datagrams. Packets are routed between computing devices using unique source and destination addresses forming part of the packets. In order to limit overhead, the source and destination addresses are of limited size. The standard internet protocol, for example, currently uses network addresses that may be represented by thirty-two bits.

Many computing devices that use a packet switched network are not permanently connected to the network, but are instead connected intermittently for sessions of varying duration. End-user computing devices used as home computers, for example, are typical of such intermittently connected devices.

In order to avoid depletion of unique network addresses, such an end-user computing device is usually assigned a network address dynamically, once per session. A session network address is provided to the end-user computing device each time a session is established. This address is used throughout the session. This, of course, limits access to the end-user computing device during the session to those other networked computers that are aware of the end-user computing device session network address for that session. These other computers are typically only those with which the end-user computing device has previously provided the network address, and are thus most typically limited to those computers that have been contacted by the end-user computing device during the session.

As a result, intermediate computing devices, such as e-mail servers with non-varying network addresses are often used to receive and buffer messages intended for the end-user computing device. The end-user device may contact such intermediaries to request and retrieve the stored messages.

Often, however, it is desirable to provide data to the end-user computing device in real time, without the end-user computer first requesting that the data be provided. Such provision of data is often referred to as "pushing" data to the end-user computing device. This is, for example, desirable in order to provide the end-user device with a notification of an external event, such as notification of a news event; notification of another user's interconnection with the network; notification of an incoming message such as a facsimile or e-mail; or the like.

Such real-time notification may be made possible by providing another network interconnected computer, referred to as a message server, with an indicator that the end-user computing device is connected to the network and with the current session network address of the end-user computing device. The message server may then "push" data to the end-user computing device.

The indicator and network address from the end-user computing device may be provided to the message server in numerous ways. The simplest known way is to initiate a program at the end-user device that is specifically used to receive "pushed" messages from the message server once a network connection has been established. This program may then provide the end-user device session network address to the server. This, however, requires a separate program to be executed at the end-user device upon establishing the network connection. Such a program is typically platform dependent, designed and programmed to take into account the particular hardware and operating system features of the end-user device. For different end-users, operating different types of computers, multiple versions of the same program are required.

The present invention seeks a more elegant method and system of notifying a remote server of an end-user computer assigned network address.

SUMMARY OF THE INVENTION

In accordance with the present invention, there is provided a method of operating a network interconnected computing device to provide an assigned network address identifying the computing device on the network to a server, the method comprising the steps of:

a. obtaining the assigned network address at the computing device;

b. contacting the server and providing an identifier of the computing device and the network address to the server; and c. contacting a second network interconnected server at a second network address stored with at least one of the server and the computing device.

In accordance with another aspect of the invention, there is provided a method of operating a computer network interconnected server comprising the steps of:

a. maintaining a database containing identifiers of known network interconnected computing devices;

b. obtaining, an identifier and an assigned network address of an interconnected computing device from the computing device;

c. comparing the identifier to entries of the database to find a matching entry in the database;

d. in response to finding a matching entry, storing the assigned network address of the computing device at the server; and e. providing the computing device with a second network address to be accessed by the computing device.

In accordance with a further aspect of the invention, there is provided a data network interconnected server comprising:

a processor;

computer memory, in communication with the processor;

a network interface in communication with the processor;

the computer memory containing
  i. a database; and
  ii. processor readable instructions adapting the processor to,
    a. obtain an identifier and an assigned network address of a network interconnected computing device from the network interconnected computing device;
    b. compare the identifier to entries of the database to find a matching entry in the database;

c. in response to finding a matching entry, storing the assigned network address of the computing device at the server; and d. provide the computing device with a second network address to be accessed by the computing device.

According to yet a further aspect of the invention, there is provided a computer network interconnected server comprising:

a. means for maintaining a database containing identifiers of known network interconnected computing devices;

b. means for obtaining, an identifier and an assigned network address of an interconnected computing device from the computing device;

c. means for comparing the identifier to entries of the database to find a matching entry in the database;

d. means for storing the assigned network address of the computing device at the server in response to finding a matching entry; and e. providing the computing device with a second network address to be accessed by the computing device.

According to yet a further aspect of the present invention, there is provided a method of operating a network interconnected computing device and server, comprising the steps of:

a. obtaining an assigned network address at the computing device;

b. contacting the server and providing an identifier of the computing device and the assigned network address to the server;

c. comparing the identifier to entries of a database stored at the server to find a matching entry in the database;

d. in response to finding a matching entry, storing the assigned network address at the server;

f. contacting a network interconnected computer at the second network address to provide data to the computing device.

According to yet a further aspect of the invention, there is provided a computer readable medium storing computer software and data, that when loaded by a server having a network interface, adapts the server to, a. maintain a database containing identifiers of known network interconnected computing devices;

b. obtain an identifier and an assigned network address of an interconnected computing device from the computing device using the network interface;

c. compare the identifier to entries of the database to find a matching entry in the database;

d. in response to finding a matching entry, store the assigned network address of the computing device at the server; and e. provide the computing device with a second network address to be accessed by the computing device, using the network interface.

Advantageously, methods and software in accordance with the invention are not dependent upon specific software or hardware platforms otherwise used by an end-user computing device.

Advantageously, the session network address may be provided to a server without repeated intervention by an end-user, and transparently to the end-user.

BRIEF DESCRIPTION OF THE DRAWING

In figures which illustrate, by way of example, embodiments of the present invention.

FIG. 4 illustrates the organization of a database at the server of FIG. 2;

DETAILED DESCRIPTION

Figure 1:
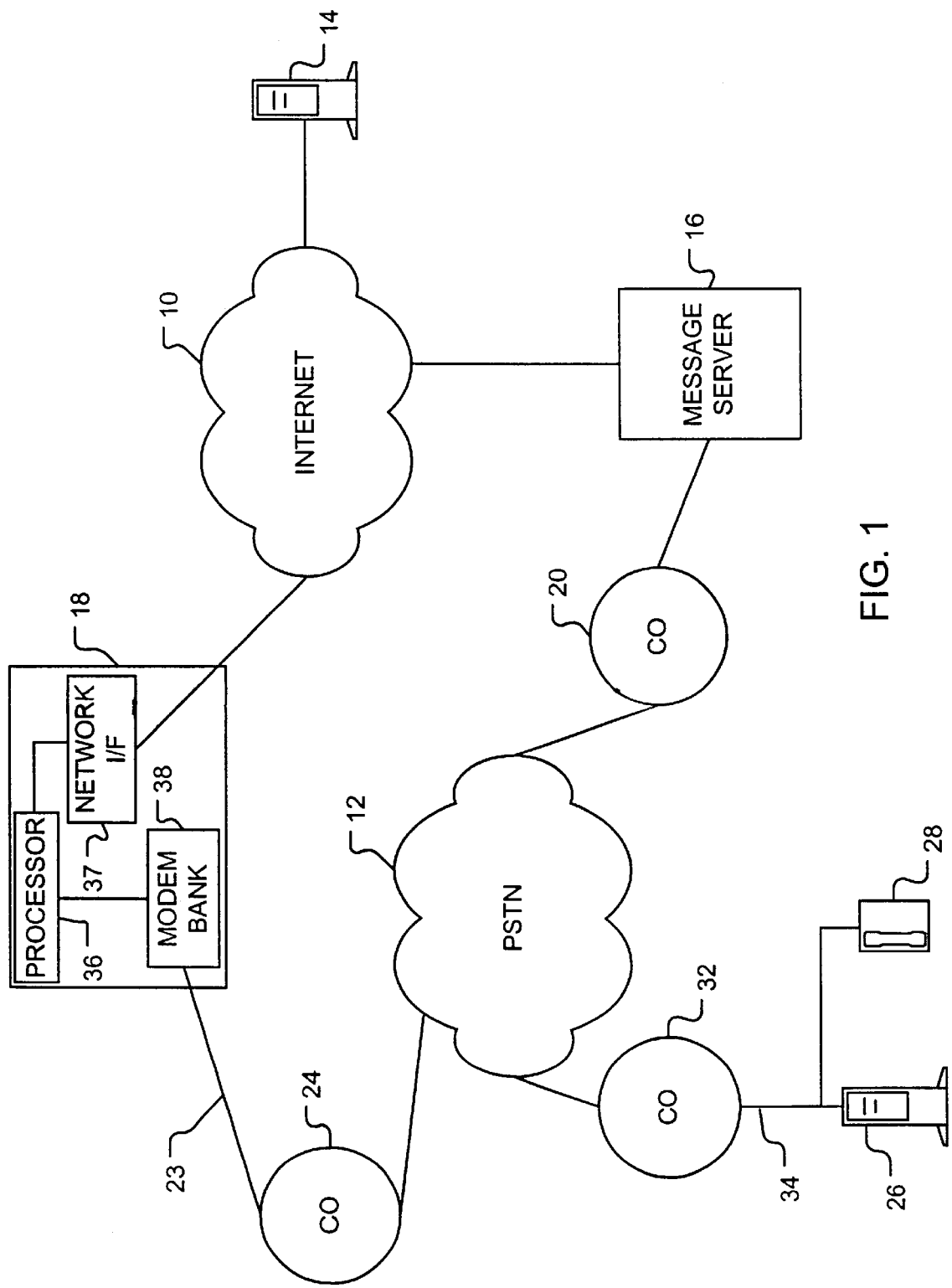
FIG. 1 illustrates a plurality of interconnected computing devices, including a message server and an enduser computing device, exemplary of embodiments of the present invention.

FIG. 1 illustrates a plurality of computing devices 14, 16, 18, and 26 interconnected to each other by way of data network 10. Network 10 is a packet switched data network, and in one embodiment of the present invention, is preferably the public internet, using the internet protocol ("IP"), as detailed in RFCs 791, to exchange data in the form of packets between interconnected computing devices, such as computing devices 14, 16, 18, and 26. Each computing device 14, 16, 18, or 26 may be a network server, used to serve files such as data, application, or an end-user workstation or terminal that makes use of other network resources. In the illustrated example, devices 14 and 26 are end-user work stations; device 18 is an internet service provider server ("ISP"); and device 16 is a message server exemplary of an embodiment of the present invention.

Devices 14, 16, 18, and 26 may be interconnected with network 10 in any of a number of ways. For example, device 14 may be directly interconnected with an internet router using an Ethernet interface. Device 26 may be connected to network through the public switched telephone network 12 (the "PSTN"). Similarly, devices 16 and 18 could be connected to network 10, by an asynchronous transfer mode ("ATM") switch (not illustrated); an integrated standards digital network ("ISDN") (not illustrated); a local area network (not illustrated); or any other suitable physical connection to network 10.

As illustrated, computing device 26 may be connected with network 10 through ISP 18 by way of PSTN 12. As noted, device 26 is an end-user workstation. A conventional telephone modem forms part of computing device 26. The modem is interconnected with PSTN 12 using a conventional telephone line 34 to central office switch ("CO") 32, forming part of the PSTN 12. Telephone line 34 is also used to provide service to telephone 28 when line 34 is otherwise not in use. As will become apparent, connection of computing device 26 to network 10 may not be permanent, but instead is initiated over PSTN 12 for sessions of varying duration.

ISP 18 comprises processor 36 in communication with a bank of modems 38 interconnected to PSTN 12 through trunk 23 to CO 24 and a network interface 37, such as a T1 data interface, Ethernet interface or the like connecting ISP 18 to network 10. ISP 18 provides subscribers with internet access through PSTN 12. Subscribers gain access to network 10 by dialing a PSTN dial number(DN) identifying trunk 23 and interconnected to modem bank 38 and establishing an IP session using conventional software at ISP 18, as detailed below. Modem bank 38 comprises a plurality of modems, typically interconnected with individual telephone lines all forming part of trunk 23 assigned to a single DN so that multiple calls to the DN assigned to ISP 18 are directed to different modems within modem bank 38.

Server 16, on the other hand, is a message server, that is interconnected to network 10 using any one of a number of known physical connections. Server 16 is adapted to provide an internet service at almost all times. As such, connection of server 16 to network 10 is typically not intermittent and is instead permanent. In one embodiment, server 16 is preferably connected with network 10 using a dedicated T1 connection. As will become apparent, server 16 is adapted to provide a service such as the internet call waiting service, an internet messenger service, an internet news notification service or the like. Generally server 16 is adapted to provide data to a network interconnected computer without a specific request for data. Such data is said to be "pushed" by server 16 to the interconnected computers. Optionally, server 16 may further be interconnected with PSTN 12, through CO 20, as illustrated.

Figure 2:
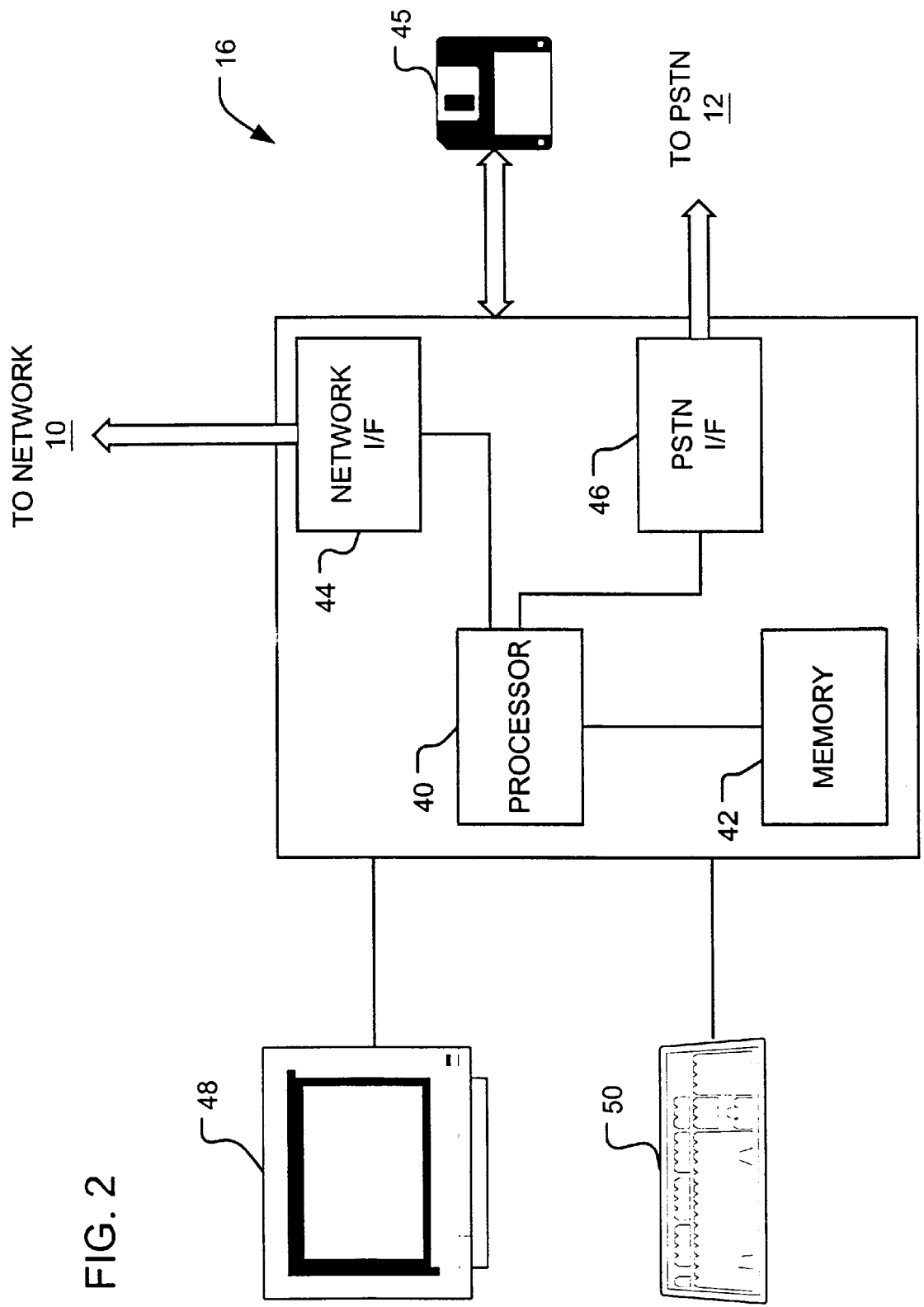
FIG. 2 is a block diagram of the architecture of a server of FIG. 1.

An exemplary architecture of server 16 is best illustrated in FIG. 2. Server 16 is typically a conventional server suitable computing device. Server 16 may for example be a SUN Sparc server; a Microsoft NT Server; a Hewlett Packard HPUX server, or the like. Server 16 comprises a processor 40, in communication with persistent storage memory 42, and network interface 44 and optionally a PSTN interface 46. As well, server 16 may comprise a display 48 and input device 50, such as a keyboard, mouse or the like.

Processor 40 generally comprises a conventional central processing unit, and may for example comprise a microprocessor in the INTEL x86 family. Of course, processor 40 could be a RISC based CPU; a Motorola CPU, or any other suitable processor known to those skilled in the art. Memory 42 comprises a suitable combination of random access memory, read-only-memory, and disk storage memory used by processor 40 to store and execute programs adapting server 16 to act as an internet message server, as detailed below. Memory 42 may include a device capable of reading and writing data to or from a computer readable medium 45 used to store software and data to be loaded into memory 42. Network interface 44 comprises any interface suitable to physically link server 16 to network 10. Interface 44, may for example be an Ethernet, ATM, or ISDN interface or even a modem that may be used to pass data, in the form of packet from and to the remainder of network 10. As noted, interface 44 is preferably a T1 network interface. PSTN interface 46 comprises an ISDN primary rate interface ("PRI") telephone interface that receives PSTN calls, and extracts caller information and passes this to processor 40, as detailed below.

Figure 3:
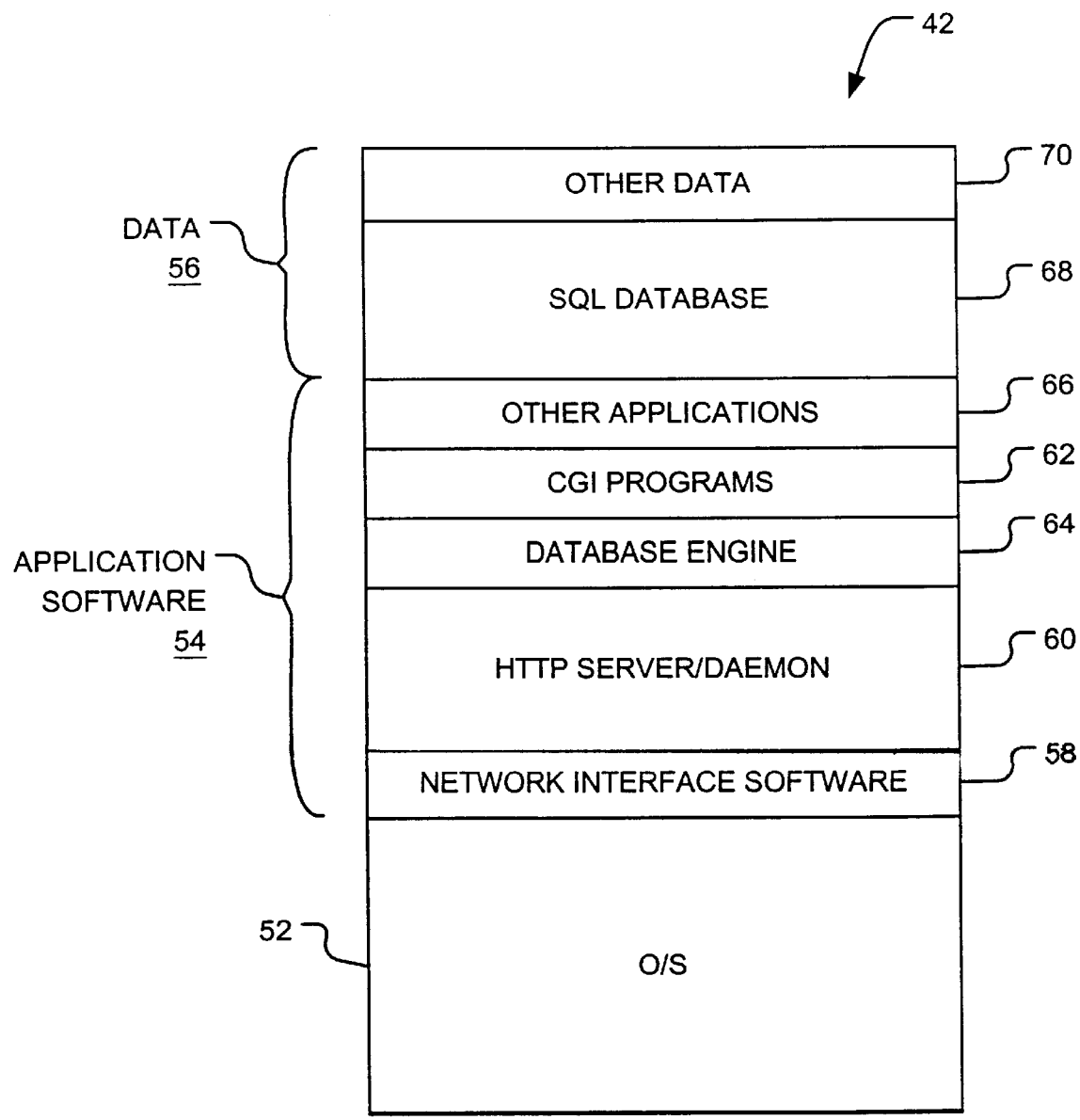
FIG. 3 illustrates the organization of memory of the server of FIG. 2.

An exemplary organization of memory 42 of server 16 is illustrated in FIG. 3. Stored within memory 42 are computer software programs and data that are loaded into working memory of server 16 to permit the server to be operable as a message server. As illustrated, memory 42 stores operating system software 52; application software 54; and data 56. Operating system software 52 may, for example, be Microsoft NT Server operating system software, UNIX operating system software, or the like. Application software 54 includes network interface software 58, which typically includes an internet protocol suite allowing communication of server 16 and thus operating system 52 with network 10, through physical network interface 44 (FIG. 2). Application software 54 further comprises a hyper-text transfer protocol ("HTTP") server application or daemon 60. HTTP application 60 may, for example be an Apache™ web server running under the UNIX operating system, or a Microsoft Internet Information Server or Back Office™ server running under the Microsoft NT operating system. Common gateway interface ("CGI") programs 64, interfacing HTTP server applications 60 with other applications and data are also stored within memory 42. CGI programs 64 may be compiled or interpreted programs, and may accordingly include a suitable interpreter such as a Perl or similar interpreter.

Additionally, forming part of application software 54 is a database application or engine 62, such as for example a structured query language ("SQL") database engine capable of retrieving, updating, deleting and otherwise operating on records stored within a database 68. Database 68 stores records representative of end-users served by the message server 16 in accordance with the present invention. Other applications 66 and data 70 may also be stored within memory 42.

As will be appreciated by those skilled in the art, HTTP server application 60 allows server 16 to dispatch IP packets over network 10 that are both IP compliant, and comply with the HTTP protocol, as detailed in RFC 1945, the contents of which are hereby incorporated by reference. Briefly, HTTP is built upon the internet protocol and allows the creation and dispatch of IP packets that may be assembled by an interconnected computer acting as a "client" to represent "pages" in the hypertext markup language ("HTML") as detailed in, for example, detailed in W3C Recommendations entitled "HTML 4.0 Specification", Raggett, Le Hors, and Jacobs; "HTML 3.2 Reference Specification", Jan. 1997, Dave Raggett; and RFC1866 the contents of which are hereby incorporated by reference. HTTP thus serves as a carrier for HTML messages.

Each HTML page is typically identified by a network identifier, referred to as a uniform resource locator ("URL"), as detailed in RFC1738 and RFC1808, the contents of which are hereby incorporated by reference. A URL takes the form of a network address that may take the form of an IP address, or a domain name, identifying a network interconnected computer, followed by a resource at that computer. The URL has been referred to as the network equivalent a file identifier. HTML pages contain data or links to data (by way of URIs) that represent data stored on the network and that may be reproduced to display text, images, or multimedia content, applications (sound, video) or the like. HTML pages contain links to other HTML pages or other network resources also identified by URIs. IP packets containing data conforming to the HTTP protocol are formed, typically from data stored within memory of a server, such as memory 42, and dispatched as a result of IP packets directed to a logical port, used to direct IP packets to an HTTP server application over network 10, to a physical interface, and IP suite of a network interconnected computing device. An HTTP server application, like application 60, decodes the HTTP requests and dispatches appropriate responses. The use of HTTP and HTML has given rise to a "web" of interrelated, network distributed HTML pages, referred to as the internet "World Wide Web".

FIG. 4 illustrates an exemplary organization of data within database 68. As illustrated database 68 contains a plurality of records 72a, 72b and so on (collectively and individually 72). Each record is typically associated with a single end-user and contains at least one field 74 containing data identifying the end-user possibly by name; one field 76 containing an end-user password; field 78 containing a status indicator indicating whether or not an end-user has initiated a network session and "registered" with server 16; a field 82 containing a session IP address, identifying the end-user's current IP address; and field 85 containing the subscriber dial number (DN) for the end-user identifying telephone line 34. As will be appreciated, database 68 has been illustrated as a relational database, but could easily be modified to be organized otherwise. It could for example be an object oriented database.

Figure 5:
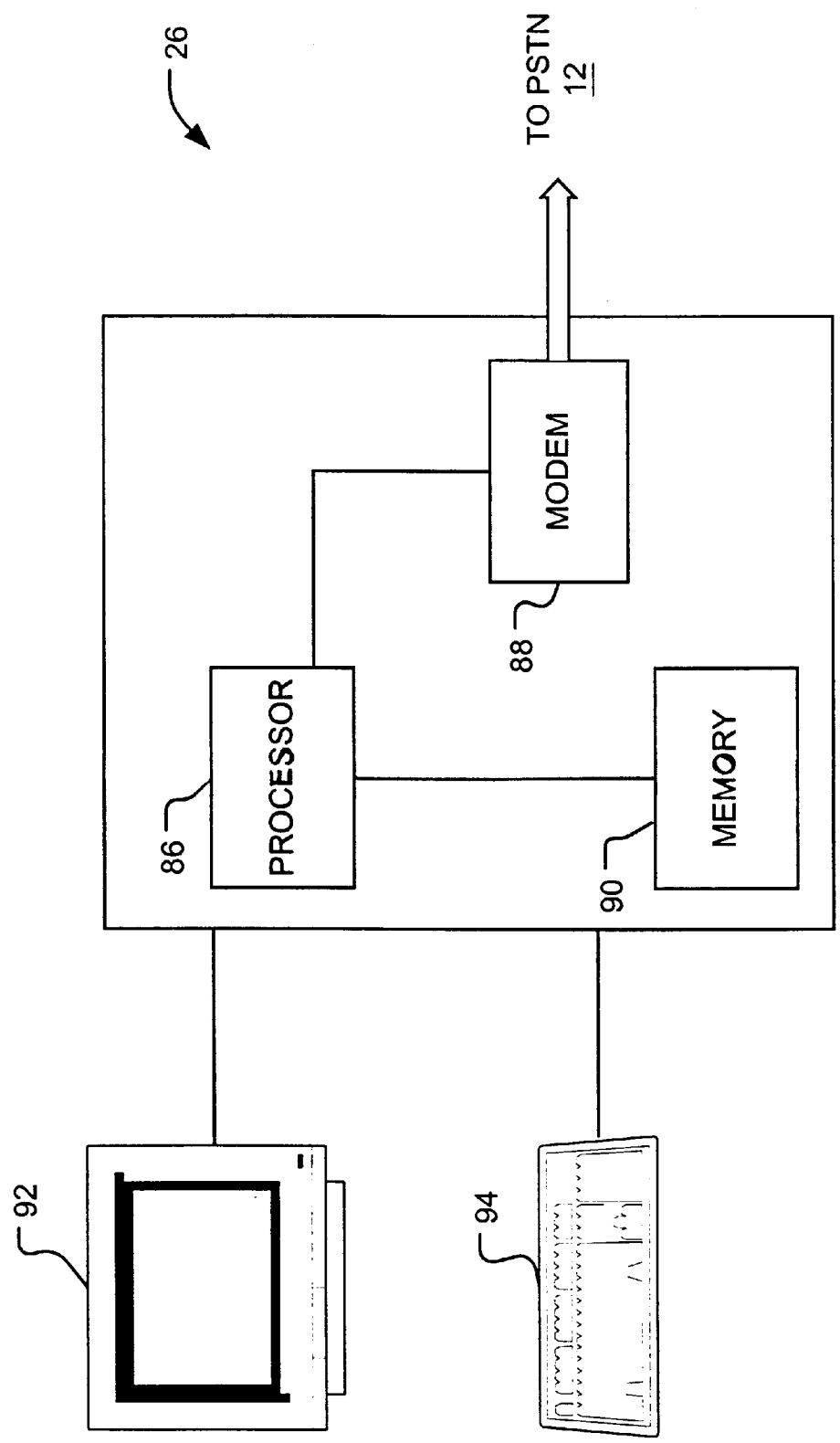
FIG. 5 illustrates the architecture of an end-user computing device, illustrated in FIG. 1.

FIG. 5 illustrates, in block diagram, an exemplary architecture of computing device 26 used by an end-user. Computing device 26 is a typical home or office computer comprising processor 86, in communication with memory 90, network interface such as modem 88, a display 92, and typically at least one input device 94. Processor 86 is typically a central processing unit and may be a processor in the INTEL x86 family. Memory 90 preferably comprises a hard drive, RAM, and ROM memories. Modem 88 is typically a conventional telephone modem such as for example a U.S. Robotics Sportster or equivalent modem.

Figure 6:
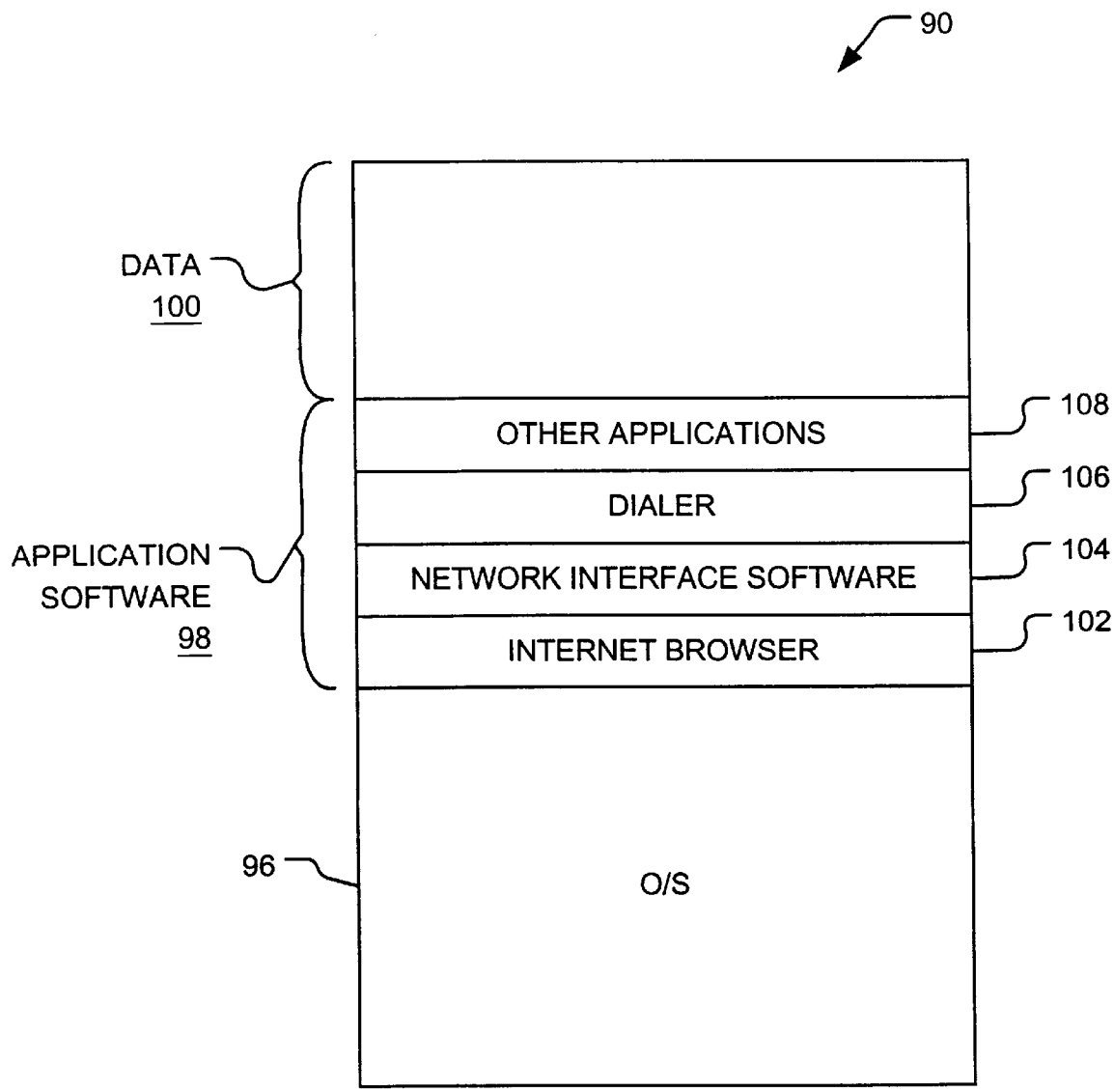
FIG. 6 illustrates the organization of the device of FIG. 4.

An exemplary organization of memory 90 of device 26 is illustrated in FIG. 6. As with memory 42 of server 16, stored within memory 90 are computer software programs and data that are loaded into operating memory of device 26. These permit device 26 to be operable as an end-user work station. As illustrated, memory 90 stores operating system software 96; application software 98, and data 100. Operating system software 96 may, for example, be Microsoft Windows NT Workstation operating system software; Windows 3.1, 95, or 98 software; Apple System 7.5 operating system software, or the like. Application software 98 includes network interface software 104, which also typically includes an internet protocol suite allowing communication of computing device 26 over modem 88 (FIG. 5) and thus operating system 96 with network 10 (FIG. 1). Application software 98 further comprises a modem dialer 106 that operates modem 88 to establish temporary connections to data network 10 via PSTN 12, as detailed below. Application software further comprises an internet browser application 102, such as the Netscape Navigator™ or Communicato™r browser; the Opera™ browser; a Mosaic™ browser; the Microsoft™ Internet Explorer™ browser; or any other suitable browser capable of making HTTP requests via network interface software, and displaying resulting responses by typically displaying pages written in HTML. Application software 98 may further comprise end-user applications 108 otherwise employed by the end-user and operator of device 26.

As understood by those skilled in the art, conventional internet browser applications and browser application 102 typically allow an end user to configure the browser to store an initial URL accessed by the browser application upon initial use of the browser application 102 and the accessibility of a network through the computer. This URL is typically set using one of the presented browser "preferences" options referred and is often referred to as the "homepage" of the end-user. The "homepage" is typically the user's starting HTML page facilitating access to the remainder of the internet World Wide Web.

Figure 7:
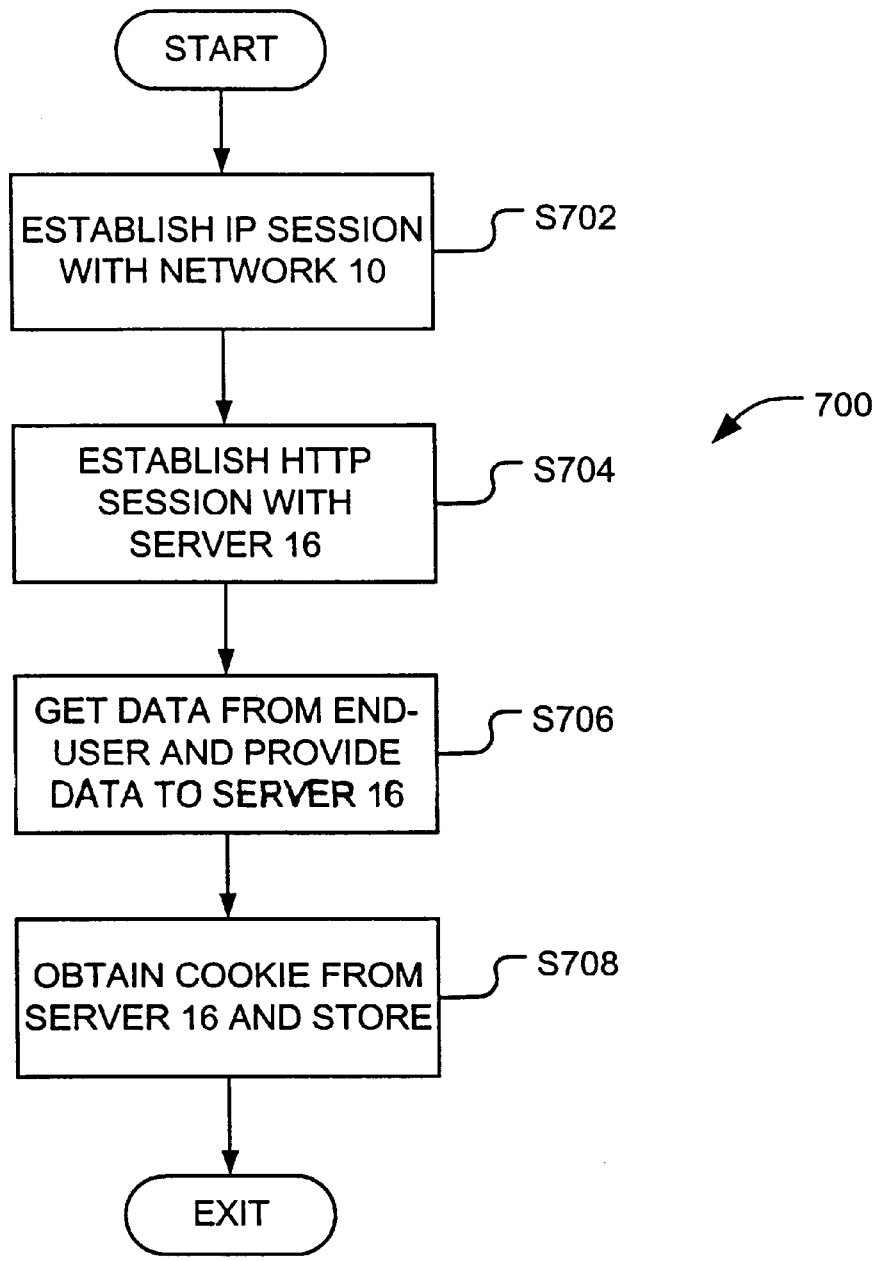
FIGS. 7–9 illustrate steps in methods exemplary of embodiments of the present invention.
Figure 8:
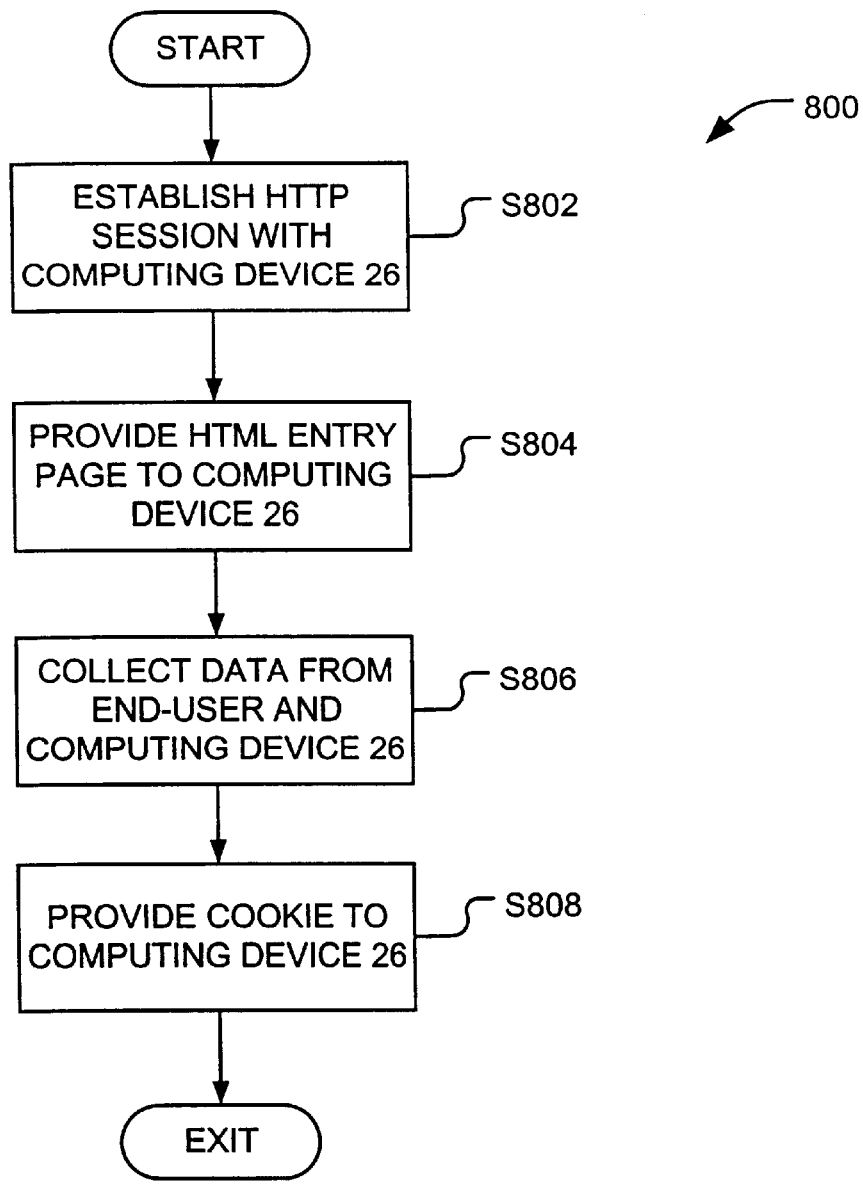

With reference to FIG. 1, in operation, an end-user at device 26 "registers" with server 16 in order to obtain messages from server 16. The steps performed at end-user device 26 are illustrated in FIG. 7, as steps 700. The steps performed at server 16 are illustrated in FIG. 8, as steps 800. Registration is typically accomplished by the end-user establishing an IP session with network 10 in step S702. Thereafter, the end-user establishes an HTTP session with server 16 using internet browser application 102 (FIG. 6), in steps S704 and S802.

The internet connection is typically established through PSTN 12 by running or launching dialer application 106 at computing device 26. Dialer application 106, causes modem 88 (FIG. 5) and an interconnected telephone line 34 (FIG. 1) to assume an off-hook state. Thereafter, modem 88 dials a PSTN DN stored within memory 90 and assigned to ISP 18. This causes COs 24 and 32 to establish a PSTN circuit between computing device 26 and ISP 18. One of the modems in a modem bank 38 of ISP 18 responds by answering the call from modem 82, and negotiating a data connection using a known modem protocol, such as V.34 bis; V.42; V.90 or another known modem protocol. Once a data connection is negotiated and established, ISP 18 prompts computing device 26 for an identifier and/or password using conventional internet service provider software (not illustrated). Dialer 106 typically provides such an identifier and/or password from data stored within memory 90. If the identifier and password are recognized by ISP 18, a connection to ISP 18 is established. ISP 18 and computing device 26, next, negotiate an IP link to computing device 26. This link may be established by a serial line internet protocol ("SLIP") or a point-to-point ("PPP") IP connection between computer and ISP, as detailed in RFCs 1055 and 1661, respectively the contents of which are hereby incorporated by reference. This may be facilitated by shell scripts executing as part of dialer 106 and application software 54 at computing device 26 and at ISP 18.

As part of establishing an IP connection between computing device 26 and ISP 18, ISP 18 assigns a temporary "session" IP address to the computing device 26. This session IP address uniquely identifies computing device 26 on network 10 and allows IP packets to be directed to computing device 26. As understood by those skilled in the art, the IP address is currently a thirty-two bit address as defined by the internet protocol used as the source address in datagrams or packets originating with computing device 26, and as the destination address by other computing devices interconnected with network 10, when directing packets to computing device 26.

The HTTP session with server 16 is established in step S704 by the end-user directing internet browser application 102 to contact server 16, using a URL identifying the server, and known to an end-user at device 26. Optionally, this HTTP session may be a secure/encrypted HTTP session protecting the confidentiality of the end-user data. Contact with server 16 causes the server to provide an HTML page to the computing device 26, which prompts the end-user to input certain registration data. The registration data is provided in step S806 and may comprise identification information, such as the user's name, address, telephone (DN) number, password, payment (credit card) information, and any other suitable identification information. This information may be prompted from the end-user using HTML pages that prompt for input.

In response to the provided information, server 16 using database engine 68 (FIG. 3) updates database 68 to contain a record reflecting the input information and associated with the end-user. Exemplary records 72a and 72b for users "John Smith" and "Jane Doe" are illustrated in FIG. 4.

Once the record is created, server 16 generates an appropriate end-user identifier and provides it to computing device 26 in step S808 (FIG. 8). The identifier may, for example, include an encrypted forms of a password and the enduser DN stored in fields 76 and 85 of the end-user record. The identifier is typically provided in the form of an HTTP state object or permanent "cookie". The permanent "cookie" is stored within memory 42 at computing device 26, typically in a "cookie" file. Information contained in the identifier is stored within fields of database 68 (FIG. 4) on server 16. As will become apparent, the "cookie" is used to later identify computing device 26 to server 16. Of course, the identifier need not be provided as a cookie. It could instead be provided and stored in some other suitable form.

Additionally, the user could provides a second network address (by way of URL) of a preferred homepage, which could also be stored within database 68.

The user at device 26 is further prompted to modify the preference setting identifying the homepage used by browser application 102 to be a homepage provided by server 16, and an appended preferred user homepage. For example, if server 16 were identified by the URL www.message.com, and the user's preferred homepage was www.nortel.com, the end-user would be prompted to configure browser application to use the homepage "http://www.message.com/scripts/lsr.dll?home=http://www.nortel.com"

As will be appreciated by a person skilled in the art, the portion of the homepage "www.message.com" identifies server 16. The portion "/scripts/lsr.dll?home=" identifies a CGI program at server 16, while the parameter "http://www.nortel.com" identifies the desired end-user hompage.

Of course, if supported by the browser application 102, this preference setting could be updated automatically by server 16.

Alternatively, or additionally, the preferred end-user homepage is stored at server 16, within a record 72 for the end-user.

Once initial registration is complete, the end-user has provided server 16 with sufficient information to obtain messages provided by server 16. The end-user could, for example, be invoiced for any service so provided by an operator of server 16. Invoicing data could also be stored within database 68.

At this time, the end-user may further be prompted to download an end-user application used to generate end-user perceptible notifications as a result of dispatched messages from server 16. The end-user application may be stored at device 26 within memory 90, as one of applications 108. The end-user application, may for example, a Windows™ based application or alternatively a Java™ applet executed by a component of internet browser application 102. The end-user application may receive packets directed by server 16 and received via modem 88 acting as a network interface at computing device 26, containing messages dispatched by server 16. As will be appreciated by those skilled in the art, such packets may be directed to the end-user application as a result of being directed to a logical port that causes the application to receive and process such packets. The application, may for example, display or sound a notification message. As noted, the end-user application may alternatively be a Java™ applet and downloaded each time an end-user contacts server 16 and establishes an HTTP session, as detailed below.

At a later time, the end-user again establishes an internet connection through PSTN 12. Again, the internet connection is typically established through PSTN 12 by running or launching dialer application 106 at device 26, establishing a PSTN circuit between computing device 26 and ISP 18; and establishing a data connection between modems at bank 38 of ISP 18 and device 26. Again, once the data connection is negotiated and established, ISP prompts computing device 26 for an identifier and/or password using conventional software stored at ISP 18 (not illustrated). Dialer 106 typically provides such an identifier and/or password. Upon successful provision of a password and identifier, ISP 18 and computing device 26, next, negotiate an IP link to computing device 26.

Again, this link may be established by a SLIP or a PPP IP connection between device 26 and ISP.

As part of establishing this IP connection between computing device 26 and ISP 18, ISP 18 again assigns a temporary "session" IP address to the computing device 26, typically different than the IP address assigned during steps 700. This session IP address now uniquely identifies computing device 26 on network 10 and allows IP packets to be directed to computing device 26 during this session.

As the IP address is dynamically assigned, computers interconnected with network 10 other than ISP 18 and computing device 26 are not aware of the session IP address of computing device 26 until such session IP address is provided to such other computers. Accordingly, other network interconnected computers, and particularly server 16, are incapable of providing information in the form of IP packets to computing device 26. Accordingly, it would be desirable to provide network devices designed to provide or push data to computing device 26, such as server 16, with an indication that computing device is network interconnected, and the session IP address of device 26.

As such, it is desirable to provide the session IP address of computing device 26 to message server 16, soon after establishing a connection to network 10. Accordingly, if the end-user of device 26 has properly re-configured, browser application 102 of computing device 26 will use an address of server 16 as a "homepage" address, as detailed above. Thus, immediately after the network browser application 102 has been launched and a network connection to network 10 has been established, browser application 102 contacts a server 16 at the homepage specified by the URL as defined in the configured preferences for browser application 102.

Figure 9:
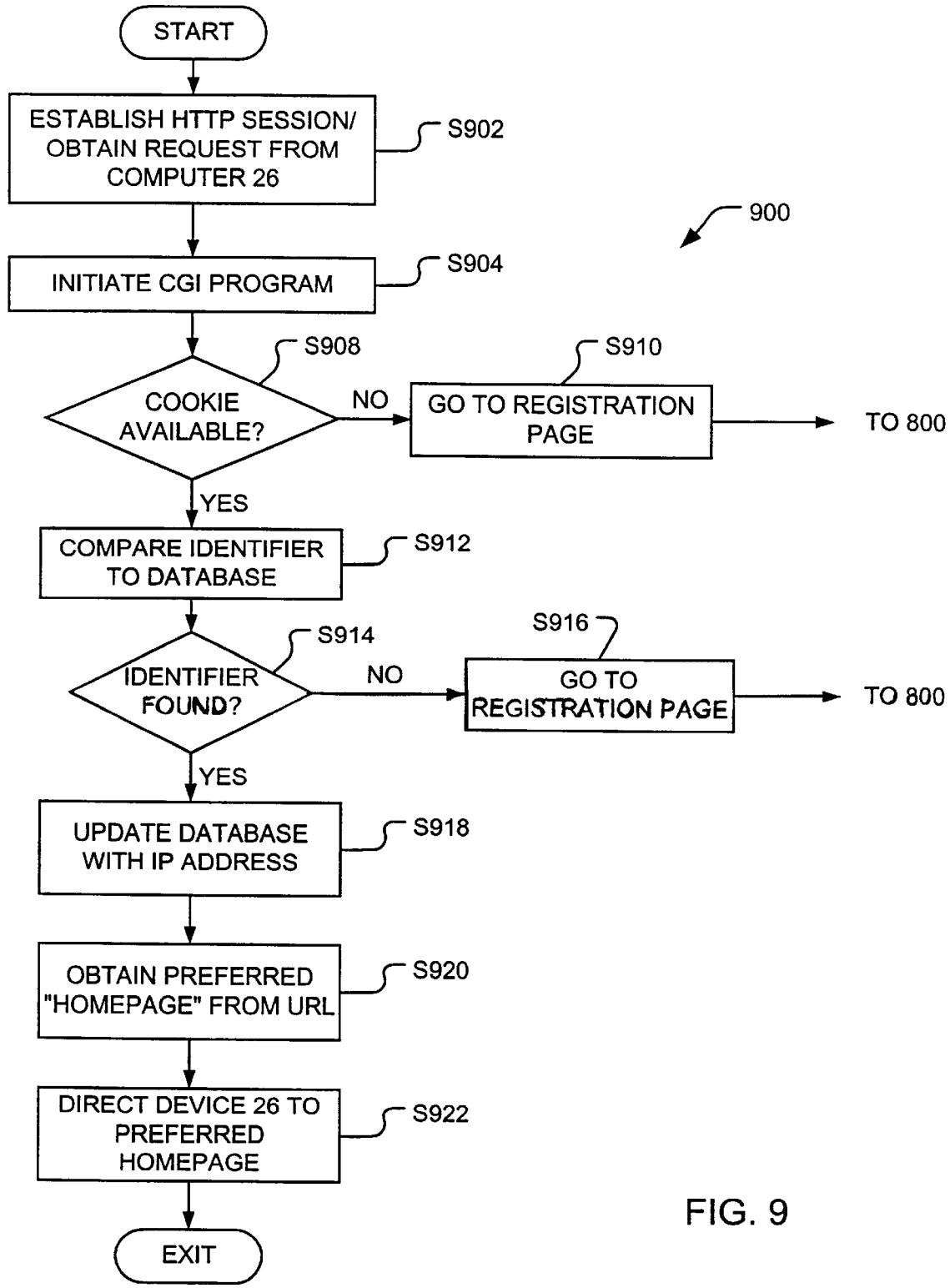

In the preferred embodiment, the homepage of browser application 102 on computing device 26 is configured to contact server 16, and establish a session between device 26 and server 16. The steps 900 taken by message server 16, in response to receiving an HTTP request to the preset homepage address are illustrated in FIG.9. Specifically, server 16 receives an HTTP request in step S902, and initiates a common gateway interface ("CGI") program from programs 64 (FIG. 3) in step S904. Additionally, during the intital HTTP request, server 26 may be provided with a persistent "cookie", stored at computing device 26 in step S808 and associated with the network address of server 26, as detailed in RFC 2109. As understood by those skilled in the art, a CGI program is initiated at server 16 in response to accessing a URL identifying the CGI program, as for example, more particularly explained in Shishir Gundavaram, "CGI Programming on the World Wide Web (Nutshell Handbook), (Sebastpol, CA: April 1996, O'Reilly & Associates) ISBN 1565921682, the contents of which are hereby incorporated by reference. In step S908, this CGI program determines if a "cookie" accompanied the HTTP request received in step S902. If no "cookie" was provided, the CGI program directs server 16 to provide the registration HTML page, in step S910, and then in steps 800 (FIG. 8).

If a "cookie" containing an identifier is available, in step S912 server 16 compares the obtained identifier with stored end-user identifiers in fields 76 and 80 (FIG. 4) for various users within database 68 using the database engine 62 (FIG. 3). If no matching identifier exist, as determined in step S914, the CGI program again directs server 16 to provide the registration HTML pages in steps S916 and 800 (FIG. 8). If a matching identifier is found, the corresponding database fields 78, and 82 (FIG. 4) are updated in step S918 to note that the end-user corresponding to the identifier has established a network connection and the end-user's session IP address, respectively.

Now, server 16 may use the IP address of end-user device 26 to "push" data to device 26. Such data may be pushed to computing device 26, in response to a specified event at server 16. For example, server 16 may monitor a resource at another URL and notify computing device 26 of a change at the resource identified by the monitored URL.

Additionally, in step S920 the CGI program extracts the stored second network address as appended to the URL of the server 16 in step S922 and directs browser application 102 to access this homepage. In the above example, the homepage address http://www.nortel.com is extracted from the URL "http://www.message.com/scripts/lsr.dll?home=http://www.nortel com". Specifically, browser application 102 may be provided with a Java script, that automatically causes the browser access the homepage. The use of Javascript is more particularly described in Javascript: The Definitive Guide (Nutshell Handbook) 2ed, (Sebastpol, Ca, Feb. 1998:O'Reilly & Associates) ISBN 1565922344, the contents of which are hereby incorporated by reference. As noted, this second network address represents the end-user's preferred homepage. By use of the Java script, contact by browser application 102 of a resource at the second network address, appears to an end-user at device 26 as contact to that end-user's preferred homepage. Thus, initial contact with server 16 may be entirely transparent to an end-user at device 26.

It should be noted that server 16, instead of device 26, could contact the device providing the end-user's preferred homepage and could act as a proxy for the homepage. The homepage could then, in turn, be provided by server 26 to device 16.

As noted, at about the same time the end-user Java applet may be downloaded and executed by a portion of browser application 102. The described Java script may additionally cause browser application 102 to create a new window used to specifically display information generated by the downloaded Java applet.

Alternatively, and additionally, the described Java applet and associated Java™ script may determine the existence of a "cookie" and may provide the server 16 with the cookie and assigned network address. While providing the "cookie" and address, the Java™ applet may establish an enhanced protocol session for exchange of data from server 16 to device 26, as described in U.S. patent application No. Ser. xx/xxx,xxx entitled "Enhanced Protocol", naming Marc Carrier as inventor, filed concurrently herewith and hereby incorporated herein by reference.

At about this time, server 16 may further provide device 26 a temporary "cookie", indicating that the assigned session IP address has already been provided to server 26. If the user later contacts the URL as specified in the browser configuration, server 26 is again provided with the temporary "cookie", and forwards the end-user directly to the preferred homepage without storing the assigned IP address and without downloading an applet.

Once the end-user device has registered with server 16, IP packets containing the "pushed" data are forwarded to the end-user device 26, using the network address stored within field 82 at server 16. As noted, the packets, may for example, be directed to a logical network port, so that the packets are processed and interpreted by a custom application executing at device 26, such as the above described Java applet. An example protocol that may be used to pass such messages is disclosed in U.S. patent application No. Ser. xxx,xxx entitled "Enhanced Protocol" and naming Marc Carrier as inventor, filed concurrently herewith.

In an exemplary embodiment, server 16 acts as an internet call waiting server, forwarding an indicator over network 10, indicating a caller is attempting to reach an end-user at device 26 whose PSTN connection is occupied as a result of the internet connection through telephone line 34. Specifically CO 32 provides the known call forward busy ("CFBL") service, redirecting calls directed to the PSTN dial number of telephone 28 to another programmable number. CO 32 is preconfigured so that the call forward busy feature for enduser at device 26 directs calls to PSTN interface 46 of server 16 by way of CO 20, in the event that telephone line 34 is busy or in an off-hook state. Calling number information associated with the call, including the called number and a caller's phone number and name, is also passed to interface 46 of server 16, where it is processed by processor 40. Upon receipt of such a call, server 16 compares the called number with DN entries in field 85. If a corresponding end-user has registered with server 16, server 16 dispatches a message indicating that a caller is attempting to dial the busy telephone line 34, as well as an indicator of the calling number over network 10 to computing device 26, using the session IP address for computing device 26. Preferably, the described Java applet will produce a user perceptible notifier that may be displayed in the window created by the Java script as described above, and may additionally allow the user to disconnect the internet connection, or to send a pre-recorded message at server 16 to the caller. Alternatively, server 16 could dispatch a notification of a news event, registration of another user at server 16, or the like.

From the above description, it will be appreciated that user device 26, ISP 18 and server 18 are all preferably independently operated. ISP 18 need not notify server 16 of internet connection by device 26. As will be appreciated, however, ISP and server 16 could be co-located. Similarly, while registration steps 700, and message provision steps 900 have been illustrated as performed at server 16, a person skilled in the art will appreciate that separate servers (not illustrated) could be used to obtain registration information in steps 700 and provide messaging service in steps 900. User information contained in database 68 could be shared or replicated between or among servers.

While the above embodiment has been described in the context of a temporary connection to network 10 using the PSTN 12, a person skilled in the art will appreciate that the described embodiments could easily be modified to accommodate other temporary network connections, by way of, for example a wireless network, an ISDN connection, an asynchronous digital subscriber loop ("ADSL") connection, or another connection known to those skilled in the art. As well, while the above embodiment has been described with reference to a single enduser, a person skilled in the art will appreciate that server 16 will typically provide similar services to a large group of end-users, and that the server 16 may be adapted to provide end-users with information about other end-users. Similarly, while the described embodiments include a server that provides data to an end-user, the server could easily be modified to only maintain statistical information about network connections of registered end-users.

As well, while the organization of software and data components at device 26 and server 16 has been illustrated as clearly delineated, a person skilled in the art will appreciate that the delineation between application, network interface software and operating system software is somewhat arbitrary. Other arrangements of such software are possible.

For example, network interface software 104 and 58 may form part of operating system software 52 or 96. Similarly, while the embodiments have been described using the HTML language and specific IP, and HTTP protocols other similar protocols could be used. The disclosed embodiments may, for example, be adapted to operate with a private IPX based network.

It will be further understood that the invention is not limited to the embodiments described herein that are merely illustrative of a preferred embodiment of carrying out the invention, and that are susceptible to modification of form, arrangement of parts, steps, details and order of operation. The invention, rather, is intended to encompass all such modifications within its spirit and scope, as defined by the claims.

What is claimed is:

1. A method of operating a network interconnected computing device executing internet browser software, to provide a dynamically assigned network address identifying said computing device on said network to a server, said method comprising:
   a. storing an identifier of said server at said computing device, as a homepage for said browser;
   b. obtaining said dynamically assigned network address at said computing device;
   c. contacting said server and providing an identifier of said computing device and said dynamically assigned network address to said server;
   d. contacting a second network interconnected server at a second network address providing a homepage chosen by a user of said computing device, an identifier of said homepage chosen by said user stored with at least one of said server and said computing device thereby transparently providing said dynamically assigned network address to said server as said computing device accesses said homepage chosen by said user.

2. The method of claim 1, wherein said second network address is stored with said computing device, and wherein said method further comprises the steps of, prior to step d.
   e. providing said second network address to said server;
   f. obtaining said second network address from said server to contact said second network server in step c.

3. The method of claim 1, wherein said network address of said second server is stored at said server, and wherein step d. comprises obtaining said network address from said server.

4. The method of claim 1, further comprising the step of:
   e. establishing a network connection between said computing device and said network, prior to step b.

5. The method of claim 1, further comprising the step of:
   e. obtaining said identifier from said server and storing said identifier at said computing device, prior to step b.

6. The method of claim 5, further comprising the step of:
   f. providing said server with registration information prior to step e.

7. The method of claim 3, wherein said assigned network address comprises an internet protocol address.

8. The method of claim 6, wherein steps e. and f. are performed using the hypertext transfer protocol.

9. The method of claim 7, wherein said identifier forms part of a hypertext transfer protocol state object.

10. A method of operating a computer network interconnected server comprising the steps of:
    a. maintaining a database containing identifiers of known network interconnected computing devices;
    b. obtaining an identifier and an assigned network address of an interconnected computing device from said computing device;
    c. comparing said identifier to entries of said database to find a matching entry in said database;
    d. in response to finding a matching entry, storing said assisigned network address of said computing device at said server; and providing said computing device with a second network address to be accessed by said computing device.

11. The method of claim 10, wherein said identifier is stored as a hypertext transfer protocol state object at said computing device.

12. The method of claim 10, wherein said second network address is provided to said server by said computing device.

13. The method of claim 12, wherein said second network address is provided during step b.

14. The method of claim 13, further comprising the step of:
    e. obtaining registration information from said computing device prior to step a, and storing said registration information in said database.

15. The method of claim 14, wherein said registration information further comprises a telephone dial number identifying a telephone line used to access said network by said computing device.

16. The method of claim 15, wherein said computer network interconnected server is further interconnected with the public switched telephone network ("PSTN") by said telephone line, and wherein said method further comprises the steps of:
    f. receiving a forwarded call from the PSTN directed to said telephone dial number identifying said telephone line, when said telephone line is busy;
    g. identifying said telephone line and said computing device using call information associated with said call;
    h. forwarding a message indicating receipt of the forwarded call to said computing device using said assigned network address.

17. The method of claim 12, further comprising the step of:
    e. providing data from said server to said computing device using said assigned network address.

18. A data network interconnected server comprising:
    a processor;
    computer memory, in communication with said processor;
    a network interface in communication with said processor; said computer memory containing
    i. a database; and
    ii. processor readable instructions adapting said processor to,
       a. obtain an identifier and an assigned network address of a network interconnected computing device from said network interconnected computing device;
       b. compare said identifier to entries of said database to find a matching entry in said database;
       c. in response to finding a matching entry, store said assigned network address of said computing device at said server and provide said computing device with a second network address to be accessed by said computing device.

19. A computer network interconnected server comprising:
    a. means for maintaining a database containing identifiers of known network interconnected computing devices;

b. means for obtaining an identifier and an assigned network address of an interconnected computing device from said computing device;

c. means for comparing said identifier to entries of said database to find a matching entry in said database;

d. means for storing said assigned network address of said computing device at said server in response to finding a matching entry and providing said computing device with a second network address to be accessed by said computing device.

20. A method of operating a network interconnected computing device and server, comprising the steps of:

a. obtaining an assigned network address at said computing device;

b. contacting said server and providing an identifier of said computing device and said assigned network address to said server;

c. comparing said identifier to entries of a database stored at said server to find a matching entry in said database;

d. in response to finding a matching entry, storing said assigned network address at said server;

e. obtaining a second network address from said server in response to providing said identifier;

f. contacting a network interconnected computer at said second network address to provide data to said computing device.

21. A computer readable medium storing computer software and data, that when loaded by a server having a network interface, adapts said server to, a. maintain a database containing identifiers of known network interconnected computing devices;

b. obtain an identifier and an assigned network address of an interconnected computing device from said computing device using said network interface;

c. compare said identifier to entries of said database to find a matching entry in said database;

d. in response to finding a matching entry, store said assigned network address of said computing device at said server; and provide said computing device with a second network address to be accessed by said computing device, using said network interface.

* * * * *